UNITED STATES PATENT OFFICE.

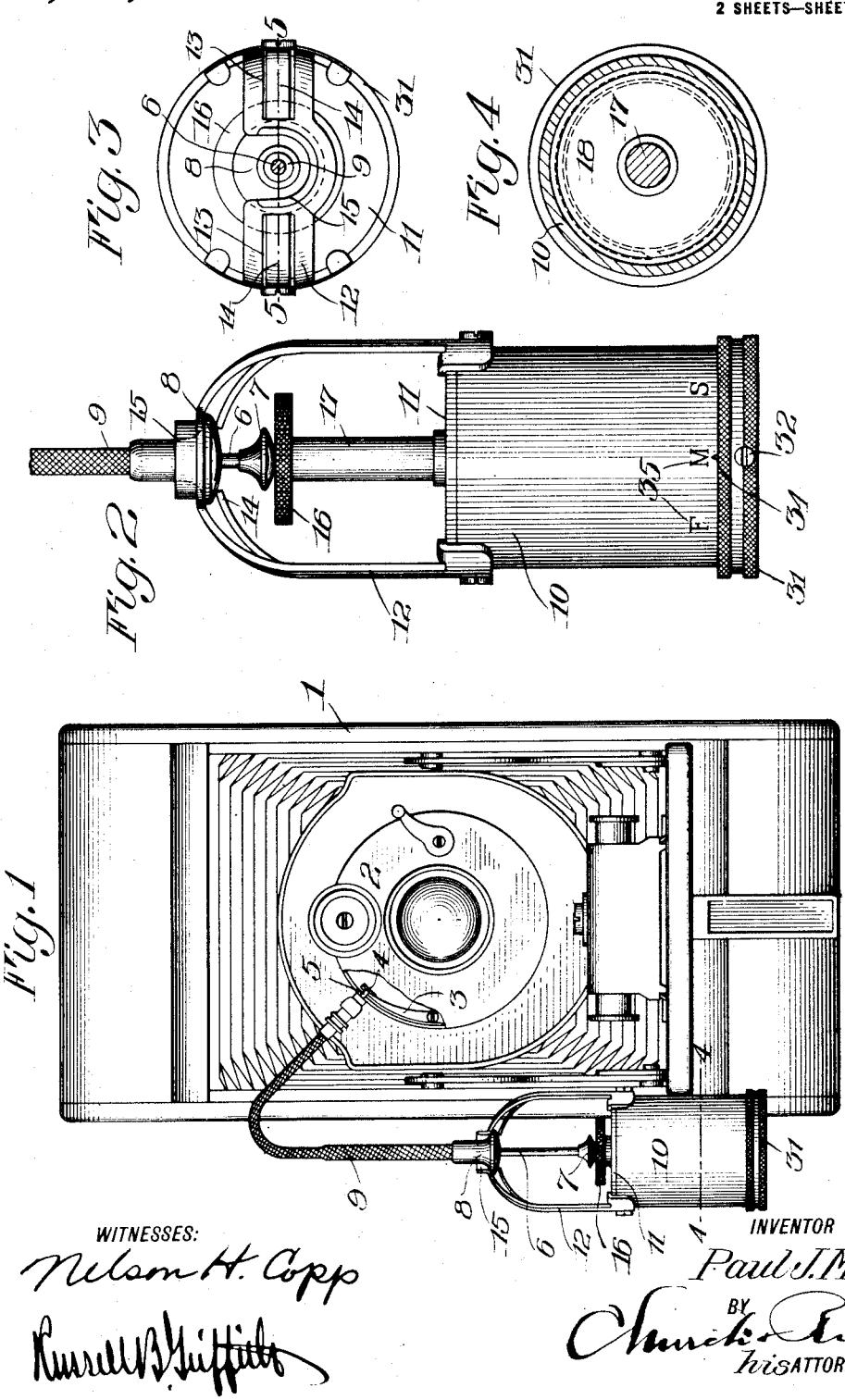

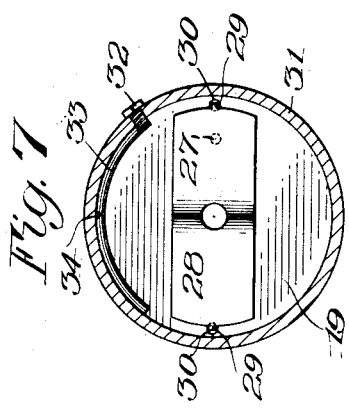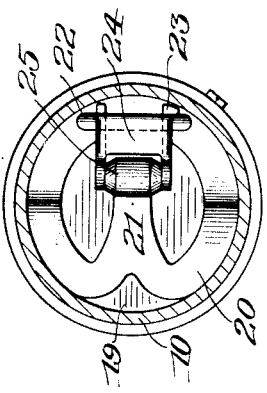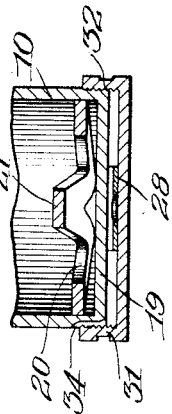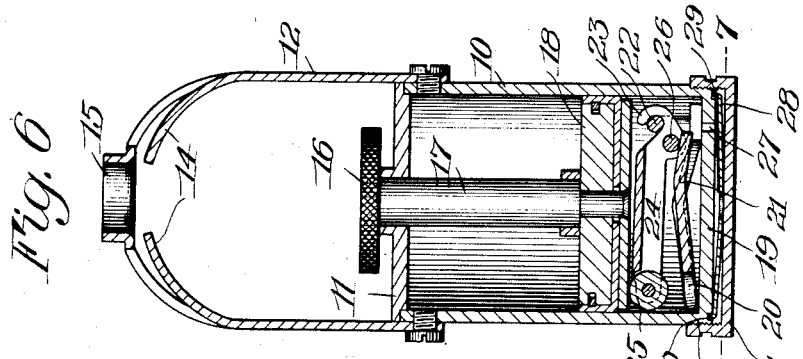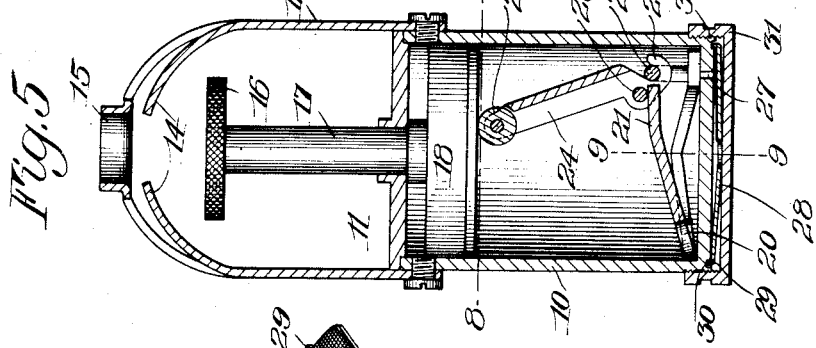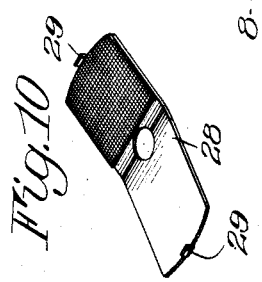

PAUL J. MARKS, OF ROCHESTER, NEW YORK, ASSIGNOR TO EASTMAN KODAK COMPANY, OF ROCHESTER, NEW YORK, A CORPORATION OF NEW YORK.

SHUTTER-ACTUATING DEVICE.

1,255,901.              Specification of Letters Patent.    Patented Feb. 12, 1918.

Application filed November 18, 1916. Serial No. 132,008.

*To all whom it may concern:*

Be it known that I, PAUL J. MARKS, of Rochester, in the county of Monroe and State of New York, have invented certain new and useful Improvements in Shutter-Actuating Devices; and I do hereby declare the following to be a full, clear, and exact description of the same, reference being had to the accompanying drawings, forming a part of this specification, and to the reference-numerals marked thereon.

My present invention relates to time controlled mechanism and more particularly to mechanical devices adapted to be set by the operator and to thereafter, at a reckonable interval, actuate or trip a photographic shutter as, for instance, in a case where the photographer himself wishes to join the group of which a picture is to be made. The invention has for its object to provide a device of this character that will be simple in both construction and operation as well as convenient for the user and which may be readily set for short, long or intermediate periods of time with reasonable accuracy. The invention contemplates the use of a spring actuated trip or shutter operating member working under the influence of a retarding device and the invention is directed in part toward producing an arrangement whereby the pressure exerted by the spring increases up to the moment that the shutter is tripped so that it will be exerting its maximum strength at that time. To these and other ends the invention resides in certain improvements and combinations of parts all as will be hereinafter more fully described, the novel features being pointed out in the claims at the end of the specification.

In the drawings:

Figure 1 is a front elevation of a camera showing a shutter provided with an actuating device constructed in accordance with and illustrating one embodiment of my invention, the said device being in set position;

Fig. 2 is an enlarged elevation of the actuator with a portion of the shutter releasing cable device, the actuator being shown in operating position and from the side opposite to that shown in Fig. 1;

Fig. 3 is a top view;

Fig. 4 is a section taken substantially on the line 4—4 of Fig. 1;

Fig. 5 is a vertical section taken substantially on the line 5—5 of Fig. 3 and showing the parts in the position of Fig. 2;

Fig. 6 is a view similar to Fig. 5 but showing the parts in the set position of Fig. 1;

Fig. 7 is a transverse section taken substantially on the line 7—7 of Fig. 6;

Fig. 8 is a transverse section taken substantially on the line 8—8 of Fig. 5;

Fig. 9 is a fragmentary vertical section taken substantially on the line 9—9 of Fig. 5, and Fig. 10 is a detail view in perspective of the valve member for the air port.

Similar reference numerals throughout the several views indicate the same parts.

Referring first to Fig. 1 of the drawings, 1 indicates a camera provided with a shutter 2 of which 3 is the releasing lever having a lip 4 to take the thrust of an incompressible flexible cable 5 terminating at the opposite end in a rigid guide shank 6 and push button 7. This is a well known form of shutter releasing device, the other button 8 in opposition to which the first is operated, being connected to a flexible casing 9 that takes the pull as the thrust of the button 7 is communicated to the lever 3 through the cable 5 so that the two forces are balanced and the instrument is not jarred by their relative movement.

The device of my invention comprises a cylinder 10 having a head 11 spanned by a yoke 12. The yoke is bifurcated at 13 (Fig. 3) on both sides of its center to provide spring fingers 14 that engage beneath the pull button 8 as shown in Fig. 2 when the said pull button occupies a flanged seat 15 at the center of the yoke into which it may be inserted from a lateral direction, the seat being open at one side as shown in Fig. 3. This arrangement prevents the movement of the button 8 in both directions. Movable toward and from the seat is a trip or actuator comprising, in the present instance, a head 16 on the rod 17 of a piston 18 operating in the cylinder, the said rod 17 being guided in a head 11. To set and attach the device, the piston is pressed down to the positions of Figs. 1 and 6 through the medium of the trip 16 and the button 8 inserted in the seat 15, as shown in Fig. 1. The button 7 and its shank 6 normally project from the button 8 and as shown in the said figure, this brings the push button 7 against the trip head 16. When the latter is released, time controlled mechanism hereinafter described forces the piston 18 and hence the trip 16 upwardly, which presses the button 7 toward the button 8 and ultimately operates the shutter just before the position of Fig. 2 is reached. In this figure, the shutter has been operated and the piston and actuator are at their upward limit of travel. When the device is reset, the button 7 is projected again by its own spring (not shown).

The power for driving the piston upwardly and the means for retarding its progress are provided in the following manner:

Resting against the lower end 19 of the cylinder 10 as shown in Figs. 5, 6, 8 and 9, is a leaf spring 20 that may have the annular form shown with a centrally disposed tongue 21, the entire leaf being bowed transversely as shown, to give the tongue ample movement when flexed. A staple 22 arranged at one side of the cylinder chamber and fixed to the spring 20 therein provides a pivot or fulcrum for the hooked end 23 of a lever 24 that thus has an open bearing detachable only in a downward direction. The opposite or free end of the lever is provided with a roller 25 that rolls across the face of the piston 18 from the position of Fig. 6 to that of Fig. 5 as the actuator 16 moves upwardly. The spring tongue 21 bears against the pin 26 on the lever located close to its fulcrum 22. When the device is set as in Fig. 6, the lever 24 is forced to a horizontal position beneath the piston 18 and the spring is depressed under tension by the pin 26. When the actuator 16 is released, the spring swings the lever to the position of Fig. 5 so that it rolls across the face of the piston. It will be noted that the relationship of the pin 26 to the fulcrum 22 with respect to the direction of movement of the piston is such that this point of application of the power of the spring moves away from the fulcrum during the raising of the piston and hence the leverage of the spring on the piston is increased until it passes the horizontal position of maximum leverage. It is at this horizontal position that the shutter is tripped, Fig. 5, as previously explained, showing merely the completion of the movement. At the same time, the roller end 25 of the lever is moving toward the fulcrum so that the leverage is again increased in this way. Therefore, the spring, instead of starting with a maximum pressure against the cylinder and thereafter rapidly diminishing its force as is usual in these devices, progresses at an ever increasing mechanical advantage so that at the instant the trip 16 is actually performing its work on the button 7, it is getting the greatest benefit from the force of the spring.

To retard the upward movement of the piston under the action of the spring, a pneumatic resistance is provided by forming a restricted aperture 27 in the end wall 19 of the cylinder 10. As the piston travels it must suck in the air it displaces through this restricted aperture and this it can do but slowly according to a well known principle. To diminish the speed of the piston and hence postpone the time at which the shutter will actually be tripped, the capacity of the opening 27 may be further restricted and varied through the medium of a valve member 28 in the present form of a bowed plate disposed across the outer face of the cylinder wall 19 so as to span the opening 27 but to normally hold itself away from it. The plate is anchored in the present instance, by ears 29 at the ends thereof that take in the recesses 30 in the piston wall and the portion of the plate in the vicinity of the opening 27 is preferably faced with rubber fabric or other suitable material that will cause it to fit tightly when desired. A screw cap 31 threaded at 32 on the exterior of the cylinder bears against the bowed portion of the plate 28 and as the cap is rotated, it presses the plate closely against the cylinder wall or allows it to separate more or less therefrom to entirely or partly close the aperture 27. A stop 32 on the cap working in a groove 33 in the cylinder limits the amount it can be turned and the cap may also be provided with a speed indicator registering, selectively, with the characters 35 on the cylinder to indicate fast, medium or slow. In the present instance, the head of the screw that constitutes stop 32 is used for this purpose as shown in Fig. 2.

A groove 34 in the cylinder (Fig. 9) maintains the interior of the cap 31 open to the atmosphere at all times to permit the entrance and escape of air passing through the aperture 27.

A device constructed in accordance with my invention is simple and may be cheaply manufactured and there is very little about it that can get out of order, while its timing is sufficiently uniform for the purpose and it requires little adjustment. Further than this, it is compact and may be made very light so as to be safely hung upon the cable release of the shutter in about the manner shown in Fig. 1.

I claim as my invention:

1. In a shutter tripping device, the combination with an air cylinder having a port, a piston therein having a trip and means controlling the flow of air through the port, of a spring for driving the piston, said spring being arranged to exert its pressure upon the piston with greater mechanical advantage toward the latter part of its stroke than during the initial part thereof.

2. In a shutter tripping device, the combination with an air cylinder having a port, a piston therein having a trip and means controlling the flow of air through the port, of a spring for driving the piston and a device interposed between the spring and piston acting to increase the mechanical advantage with which the former acts upon the latter as the piston is advanced.

3. In a shutter tripping device, the combination with an air cylinder having a port, a piston therein having a trip and means controlling the flow of air through the port, of a spring for driving the piston, and a lever in the cylinder through which the power of the spring is transmitted to the piston, the point of application of the spring to the lever being adapted to recede from the fulcrum of the latter as the piston advances.

4. In a shutter tripping device, the combination with an air cylinder having a port, a piston therein having a trip and means for controlling the flow of air through the port, of a spring for driving the piston, and a lever in the cylinder through which the power of the spring is transmitted to the piston, the point of application of the lever to the piston being adapted to approach the fulcrum of the lever as the piston advances.

5. In a shutter tripping device, the combination with an air cylinder having a port, a piston therein having a trip and means for controlling the flow of air through the port, of a spring for driving the piston, and a lever in the cylinder through which the power of the spring is transmitted to the piston, the point of application of the spring to the lever being adapted to recede from the fulcrum of the latter and the point of application of the lever to the piston to recede from said fulcrum as the piston advances.

6. In a shutter tripping device, the combination with an air cylinder having a port, a piston therein having a trip and means for controlling the flow of air through the port, of a fulcrum in the cylinder, a lever having a bearing at one end on the fulcrum and adapted to engage the face of the piston at the other, and a leaf spring in the cylinder acting against an intermediate portion of the lever.

7. In a shutter tripping device, the combination with an air cylinder having a port, a piston therein having a trip and means for controlling the flow of air through the port, of a fulcrum in the cylinder, a lever having an open bearing at one end hooked over the fulcrum and a roller at the other engaging the face of the piston, and a leaf spring in the cylinder slidably acting against an intermediate portion of the lever.

8. In a shutter tripping device, the combination with an air cylinder having a port, a piston therein having a trip and means for actuating the piston, of a device for regulating the passage of air through the port, comprising a resilient plate adapted to normally hold itself away from the port, and a controlling device for progressively compressing the plate into sealing relationship with the port.

9. In a shutter tripping device, the combination with an air cylinder having a port in an end face thereof, a piston in the cylinder having a trip and means for actuating the piston, of a resilient plate spanning the end face of the cylinder and adapted to normally hold itself away from the port, and a rotatable cap threaded upon the exterior of the cylinder to compress the plate variably into sealing relationship with the port.

PAUL J. MARKS.

Witnesses:
M. Joseph Sullivan,
R. Harry Rutan.